INVENTOR
RICHARD W. AHRONS &
STANLEY KATZ
BY H. Christoffersen
ATTORNEY

INVENTOR
RICHARD W. AHRONS &
STANLEY KATZ
BY H. Christoffersen
ATTORNEY

United States Patent Office 3,493,786

Patented Feb. 3, 1970

3,493,786

UNBALANCED MEMORY CELL

Richard W. Ahrons, Somerville, and Stanley Katz, East Brunswick, N.J., assignors to RCA Corporation, a corporation of Delaware Filed May 2, 1967, Ser. No. 635,590
Int. Cl. H03k 3/284, 21/02
U.S. Cl. 307—279 9 Claims

ABSTRACT OF THE DISCLOSURE

An active storage or memory cell is disclosed which comprises a four-transistor "flip-flop" in an unbalanced configuration, in which the impedance of one branch of the cell is greater than the impedance of the other branch. Input signals are applied at a point common to the output electrodes of the transistors in the high impedance branch and the control electrodes of the transistors in the low impedance branch.

The invention herein described was made in the course of or under a contract or subcontract thereunder with the Department of the Air Force.

BACKGROUND OF THE INVENTION

With the arrival of some of the newer types of semiconductor devices, e.g., insulated-gate field-effect transistors, it has become practical to construct storage or memory cells in which all of the components are active devices. One such cell, shown in FIGURE 19(*b*) of Patent 3,191,061, comprises two parallel circuit branches each having one P-type and one N-type transistor connected in series. The drains of the two transistors in a branch are connected to each other and to the gates of the transistors in the other branch by negligible impedance means. Input signals for switching the state of the cell may be applied at a point common to the drains of the transistors in the first branch and the gates of the transistors in the second branch.

Because one of the transistors in the first branch is "on" in the steady state condition, and both may be "on" during a switching transient, either or both of those transistors tends to shunt a portion of the input signal to ground, whereby the switching time is increased. This may be effectively avoided by selecting the four transistors of the memory cell to having a higher impedance than the impedance of the input circuitry. However, if the flip-flop transistors all have a high impedance, the regeneration time required for the state of the flip-flop to reach its final condition is unnecessarily long. The aforementioned also holds true in that type of four-transistor flip-flop in which all of the transistors are of the same conductivity type, and in which one transistor in each branch operates as a load for the other transistor by tieing the gate of the load transistor to its source electrode.

One way in which this undesirable division of the input signal has been avoided without high impedance transistors is shown, for example, in FIGURE 3 of the article, "Silicon on Sapphire Complementary MOS Memory Systems," by J. F. Allison, J. R. Burns and F. P. Heiman, appearing in the 1967 ISSCC Digest of Technical Papers, at page 76. The technique there employed is to connect a transistor in the cross-coupling loop between the drains of the transistors in the first circuit branch and the gates of the transistors in the second branch, and by turning this coupling transistor off while the state of the flip-flop is being changed. In that way, there is no source-drain path of an "on" transistor connected at the input point during the write-in period. Such a circuit, in addition to requiring the use of at least one extra transistor, and preferably two parallel transistors of opposite conductivity type in the one-coupling network, also requires additional silicon area, a factor which can be of great importance in a large scale integrated array.

Accordingly, it is a object of this invention to provide a storage or memory cell of active elements which does not require the use of a transistor in the cross-coupling network and which is not limited in switching speed by the high impedance transistors in the first circuit branch.

BRIEF SUMMARY OF THE INVENTION

An improved storage cell embodying the invention comprises first and third semiconductor devices having their conduction paths connected in series in a first circuit branch, and second and fourth semiconductor devices having their conduction paths connected in series in a second circuit branch. The output electrodes of the first and third devices are connected to each other and to the control electrode of the second device by negligible impedance means, and the output electrodes of the second and fourth devices are connected to each other and to the control electrode of the first device by negligible impedance means. Input signals are applied at a point common to the output electrodes of the first and third devices by way of the conduction path of at least a fifth semiconductor device. The first and third devices are selected so that their conduction path and impedances are higher than the impedances of the conduction paths of the second, fourth and fifth devices for the same value of forward bias.

BRIEF DESCRIPTION OF THE DRAWINGS

In the accompanying drawing, like reference characters denote like components.

DETAILED DESCRIPTION OF THE INVENTION

Figures 1, 2:
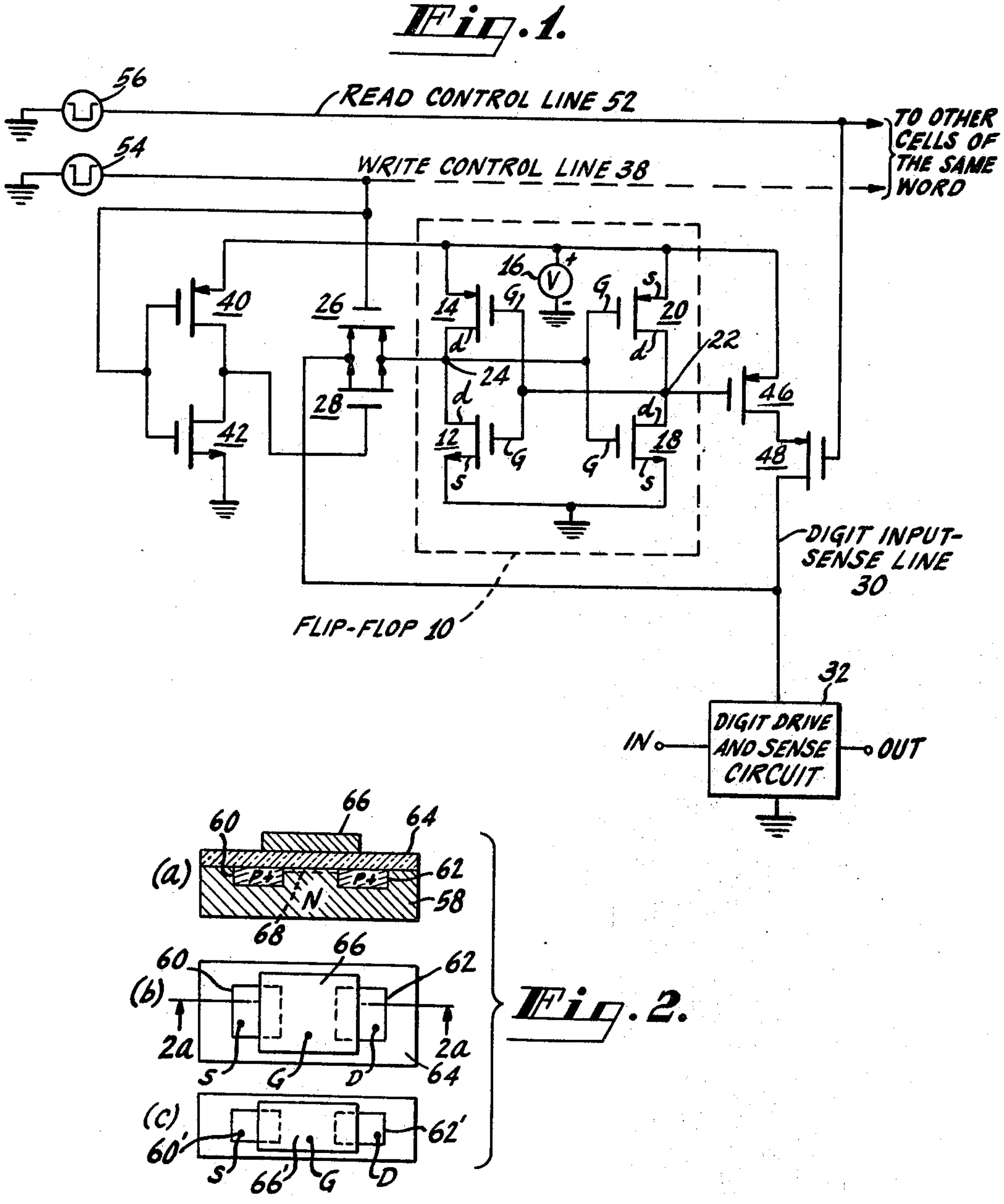
FIGURE 1 is a schematic diagram of a complementary symmetry memory cell embodying the invention.
FIGURES 2(*a*), 2(*b*) and 2(*c*) are diagrams of transistors which may be used in practicing the invention.

The semiconductor devices contemplated for use in practicing the invention are ones of the general type known as insulated-gate field-effect transistors, or devices having similar characteristics. For this reason, the memory elements are illustrated in the drawing as employing insulated-gate field-effect transistors and will be so described hereinafter. However, other suitable devices may be employed.

An insulated-gate field-effect transistor may be defined generally as a majority carrier device that comprises a body of semiconductive material having a source (input electrode) and a drain (output electrode) defining the ends of a conduction or current carrying channel through the body. A gate (control electrode) overlies at least a portion of the conduction channel and is insulated therefrom and from the source and drain, whereby it does not draw any current under steady state operating conditions, or at least it draws no appreciable current. Such transistors may be of either the P-type or the N-type by way of example. A P-type device has the characteristic that the impedance of its conduction channel has a relatively high value when its gate voltage is more positive than its source voltage, and has a relatively low value when the gate voltage is negative with respect to its source voltage. The N-type transistor has the opposite impedance conditions for the source-drain voltage indicated above, i.e., the impedance is relatively high when the gate voltage is less positive than the source voltage.

Two known types of insulated-gate field-effect transistors are the thin-film transistor (TFT) and the metal-oxide semiconductor (MOS). Some of the physical and operating characteristics of a TFT are described in the article "The TFT—A New Thin-Film Transistor," by P. K. Weimer, appearing at pages 1462–1469 of the June 1962 issue of the Proceedings of the IRE. The MOS transistor is described in an article entitled, "The Silicon Insulated-Gate Field-Effect Transistor," by S. R. Hofstein and F. P. Heiman, in the September 1963 issue of the Proceedings of the IEEE at pages 1190–1202. A third more recent device is the so-called MNS transistor, which differs from the MOS transistor in that the insulator between the gate and the channel is silica nitride rather than silicon dioxide.

In FIGURE 1, the "flip-flop" 10 is shown as comprising two branch circuits connected in parallel. The first branch includes a first transistor 12 of one conductivity (shown as N-type) and a third transistor 14 of the opposite conductivity type (shown as P-type) having their source-drain paths connected in series, in that order, between a point of reference potential, indicated as circuit ground, and the positive terminal of a source 16 of bias voltage, e.g. a battery. The second branch is similar to the first branch and comprises the source-drain paths of a second transistor 18 (N-type) and a fourth transistor 20 (P-type).

The drains of the first and third transistors 12 and 14 are connected to each other and cross-coupled to the gates of the other transistors 18 and 20 by negligible impedance means, e.g., wire. In a similar manner, the drains of the second and fourth transistors 18 and 20 are connected to each other and cross-coupled to the gates of the first and third transistors 12 and 14 by negligible impedance means.

The flip-flop, as thus far described, is schematically the same as the flip-flop shown in FIGURE 19(*b*) of Patent 3,191,061. The difference is in the selection of the transistors. In FIGURE 1, transistors 12 and 14 in the first circuit branch are selected to have higher impedance conduction channels than the transistors 18 and 20 for the same value of forward source gate bias. That is to say, the impedance of the conduction channel of transistor 12 is greater than the impedance of the conduction channel in transistor 18 when the gates of these transistors are each at +V volts. Correspondingly, the impedance of the conduction path of transistor 14 is greater than that of transistor 20 when the gates of these transistors are at ground potential. The importance of this feature will become clearer as the discussion proceeds.

The junction 24 common to the drains of the transistors 12 and 14 is the input point of the flip-flop. A fifth, P-type transistor 26 and a sixth, N-type transistor 28 have their conduction channels connected in parallel between the input point 24 and a common input-sense line 30 which is connected to a digit driver and sense circuit 32. The latter circuit preferably is of the type described and illustrated in Patent 3,275,996, issued to Joseph R. Burns on Sept. 27, 1966. The two transistors 26 and 28 operate as a complementary symmetry transmission gate for writing new information into the memory cell. These transistors are selected to have lower impedance conduction paths than those of the transistors 12 and 14 in the first circuit branch and, preferably, the impedances of the transistors 26 and 28 are substantially the same as those of the transistors 18 and 20 for the same value of forward gate-source bias.

The gate electrode of transistors 26 is connected to a write control line 38, which line is common to all of the memory cells of the same word in a word organized memory. By the same token, the common input-sense line is common to all of the bits of like significance in the several words. The write line 38 also is connected to the gates of a complementary inverter comprising transistors 40 and 42, the common output of which is applied at the gate of transistor 28.

The output of the memory cell, taken as a point 22 common to the drains of transistor 18 and 20 is connected to the gate of a P-type transistor 46. Alternatively, junction 24 could be taken as the output of the cell. Transistor 46 has its source connected to the positive terminal of voltage source 16, and has its drain connected to the source of a further P-type transistor 48. Transistor 48 has its drain connected to the input-sense line 30, and has its gate connected to a read control line 52, which line is driven from a source 56 and is common to the read-out gates of all of the cells of the same word in memory.

FIGURE 2 is illustrative of one method of providing transistors having different impedance value conduction paths. FIGURE 2(*a*) is a cross-sectional view in elevation taken along the lines *a–a'* of FIGURE 2(*b*), and is seen as comprising an N-type substrate having diffused therein a first P+ zone 60 and a second diffused P+ zone 62. These two zones are the source and drain respectively. Overlying the source and drain and the body 58 is a layer 64 of insulating material, which may be silicon dioxide, by way of example. Overlying a portion of the source and drain and the conduction channel therebetween is a metallic gate electrode 66 which is in contact with the upper surface of the insulating layer 64. The conduction channel 68 is the portion of the substrate 58 between the source 60 and the drain 62 and immediately beneath the insulating layer 64.

FIGURE 2(*b*) is a plan view of the transistor. As shown in FIGURE 2(*b*), the gate electrode 66 is slightly wider than the source and drain 60 and 62 zones. The main portion of the conduction channel is the portion beneath the gate and between the source 60 and drain 62, though there may be some fringing. The impedance of the conduction channel, for a given applied source-drain voltage is a function of the width of the conduction channel, where the width is measured in a direction normal to the conduction channel, i.e., in a direction from the top to the bottom of FIGURE 2(*b*).

The device of FIGURE 2(*c*) is similar to that of FIGURE 2(*b*), with the exception that the widths of the source and drain 60' and 62' in FIGURE 2(*c*) are smaller than those of the corresponding elements in FIGURE 2(*b*). Likewise, the gate electrode 66' has a smaller width than the gate 66 of FIGURE 2(*b*). Consequently, the width of the conduction channel between the source and drain in the FIGURE 2(*c*) device is smaller than that of the FIGURE 2(*b*) device, whereby the impedance of the FIGURE 2(*c*) device is greater. One benefit which results from the higher impedance device is the smaller area required to fabricate the device in an integrated structure, and area is an important factor in a large scale array. Corresponding relatively high and relatively low impedance P-type devices are fabricated in a smaller manner to that described above, in which case the substrate 58 is P-type material and the source and drain regions 60 and 62 are N+ material.

Consider now the operation of the circuit in FIGURE 1. Ordinarily, the write control line 38 is maintained at +V volts by a control source 54, in which case the transmission gate transistor 26 remains biased in an off condition. The +V volts, when applied to the gates of inverter transistors 40 and 42 biases transistor 40 off and biases transistor 42 on, whereby the gate of transistor 28 is maintained at ground potential to bias off the transistor 28. Under these conditions, no information can be written into the memory cell 10. When it is desired to write information into the cell, the control source 54 switches to a state in which ground potential is applied to the write control line 38. Transmission gate 26 then is biased in the on condition directly, and transistor 28 is biased in the on condition by way of the complementary inverter.

Let it be assumed that the voltage on the common input-sense line 30 is at +V volts at this time, and that the voltage at output point 24 of the memory cell is at ground potential just prior to the conduction of the transistors 26 and 28. It is the function of the transmission gate transistors 26 and 28 to charge the capacitance between output point 24 and ground to +V volts. If the impedances of transistors 26 and 28 are comparable in value to those of the transistors 12 and 14, it may be seen that the input voltage +V will be distributed approximately equally between the digit line and the input point 24, and between the input point 24 and ground, whereby the input point 24 will not be driven to +V volts. Moreover, a greater period of time will be required to charge the capacitance to the turn-on threshold voltage of the transistor 18 in the second circuit branch. For this reason, the transistors 12 and 14 are selected to have impedances which are relatively high with respect to the impedances of the input transistors 26 and 28. In the latter case, a much larger voltage will appear between the input point 24 and ground, and the capacitance therebetween will charge much more rapidly.

The transistors 18 and 20 are selected to have conduction channels whose impedances are much smaller than the impedances of the transistors 12 and 14. By this means, once the switching threshold of these transistors 12 and 14 has been exceeded, the capacitance between point 22 and ground can charge and discharge rapidly. Since it is the voltage at point 22 which is applied at the gates of the transistors 12 and 14, it can be seen that the regeneration cycle is greatly shortened by the use of low impedance transistors 18 and 20, and a much higher speed of write-in results. It is this unbalanced flip-flop arrangement, i.e., unbalance of conduction channel impedances in the two circuit branches of the flip-flop, which allows a high write-in rate, when taken in conjunction with the relatively low impedance conduction channels of the transmission gate transistors 26 and 28.

To read out of the cell, the write control line 38 is maintained at +V volts to bias off the transistors 26 and 28. The voltage on the read control line 52 is lowered from +V volts to ground potential to bias on transistor 48 in the read gate. If the transistor 18 is conducting at this time, both of the transistors 46 and 48 will be biased in the low impedance condition, and a current will flow from the voltage source 16 and through the conduction paths of these transistors to the sense circuit 32. The input-sense line 30 is terminated in a low impedance and maintained at ground potential at this time, and it is the current flowing through the transistors 46 and 48 which is sensed to determine the state of the memory cell. On the other hand, if the transistor 18 is off and the transistor 20 is on during the read operation, transistor 46 will remain in the nonconducting condition, and no current will flow in the input-sense line 30. Read-out is nondestructive, inasmuch as the transmission gate transistors 26 and 28 are blocked at this time.

In summary, the characteristics of the memory cell as thus described are (1) fast switching speed due to the transmission gate drive scheme and the unbalanced flip-flop arrangement, and (2) low standby power dissipation inherent in the complementary symmetry of the flip-flop. A further advantage which obtains is reduced area requirements for the cell and its associated gates due to the fact that no transistor is required in either cross-coupling network of the flip-flop, and due to the fact that the high impedance transistors 12 and 14 require less area than a lower impedance transistor.

Figure 3:
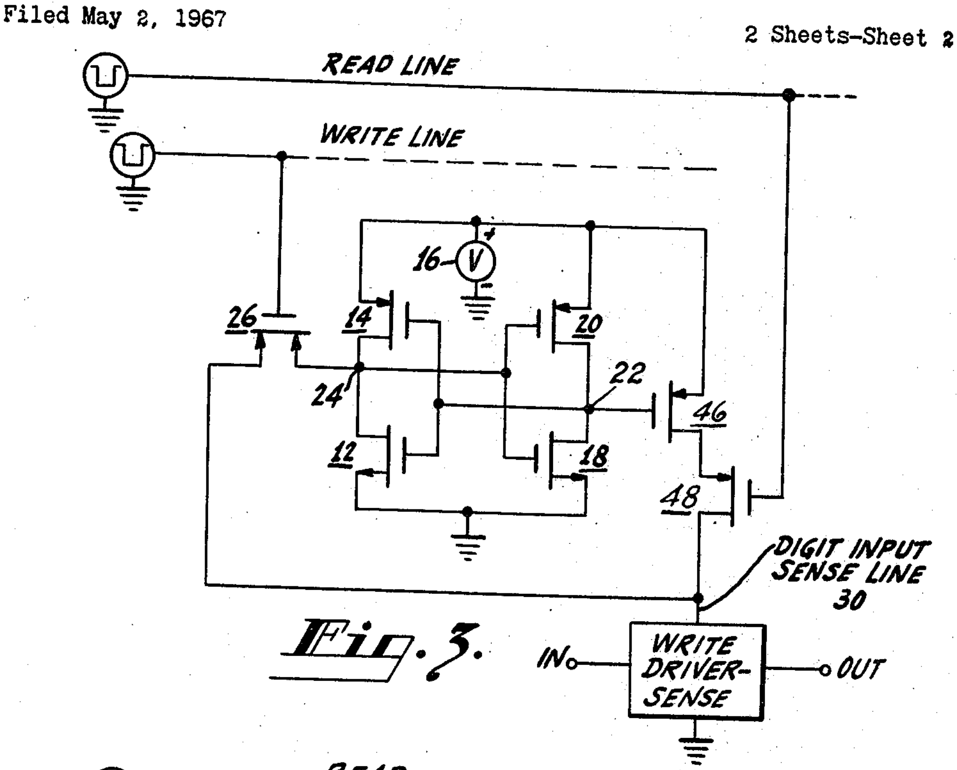
FIGURE 3 is a schematic diagram of a modified form of the FIGURE 1 circuit.

The circuit of FIGURE 3 employs the same type of flip-flop described previously. Also, the read-out gate is the same. The difference between the two circuits is in the write-in circuitry. In FIGURE 3, only a single P-type transistor 26 has its conduction path connected between the inuput point 24 and the input-sense line 30. The other transistor 28 and the complementary inverter transistors 40 and 42 are omitted. As in the FIGURE 2 circuit, the transistors 26, 18 and 20 have lower impedance conduction channels than either of the transistors 12 and 14.

One feature characteristic of a single transmission gate transistor, e.g., the transistor 26, is that the transistor operates as a source-follower when the voltage at the output point 24 is at ground potential and the voltage on the input sense line 30 is at +V volts. When the write pulse is applied to the transistor 26, the voltage at junction 24 rises toward +V volts. However, it can never reach this value since the transistor will turn off when the difference in voltage between the point 24 and the gate of the transistor 26 is less than the conduction threshold. This condition is overcome by driving the gate of transistor 26 between +V volts and −V volts instead of between +V volts and ground potential, as in the case of FIGURE 1 circuit. Operation of the circuit otherwise is the same as that of the FIGURE 2 circuit, and the same advantages obtain by virtue of the unbalanced flip-flop structure.

Figure 4:
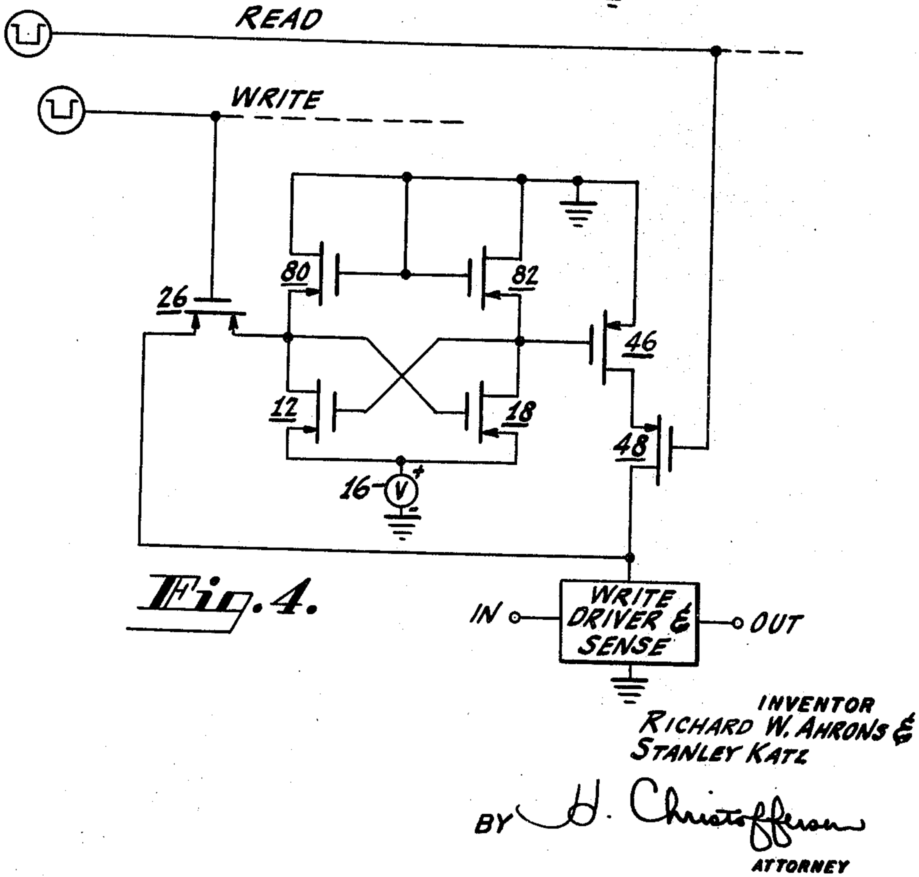
FIGURE 4 is a schematic diagram of another memory cell embodying the invention.

FIGURE 4 is generally similar to FIGURE 3 with the exception that all of the transistors are of the same conductivity type, illustrated as P-type. The transistors 80 and 82 operate as active loads for the transistors 12 and 18, and for this reason have their gates connected to a point of fixed potential, i.e. the drains of those transistors. Also, the sources of transistors 80 and 82 are grounded, and the sources of transistors 12 and 18 are connected to the positive terminal of bias source 16.

As in the case of the other two circuits, the transistors 12 and 80 are selected to have higher impedance conduction channels than those of the transistors 18, 82 and 26. The FIGURE 4 circuit is not quite as fast in operation as the complementary symmetry memory cell due to the fact that the gate voltages of the transistors 80 and 82 are always maintained at the same value. However, this circuit has the advantage that only one type of transistor is required and, therefore, the circuit is easier to fabricate in integrated form with state-of-the-art integration techniques.

The phrases "negligible impedance" and "negligible impedance means" have been used at various places herein to describe the manner in which the two transistors of a flip-flop circuit branch are connected to each other and cross-coupled to the transistors in the other circuit branch. In the schematic drawings of the circuits, these connections are shown as wires and, as is known, a short wire has very little resistance, i.e. essentially zero. However, in the actual construction of the circuit, the connection may have some incidental impedance. An example is a circuit constructed in monolithic form employing integrated circuit techniques. It frequently happens there that so-called cross-overs of interconnections cannot be avoided for practical purposes. In that event, one of the interconnections sometimes is made via a tunnel in the semiconductor material or by a "well." The interconnection sometimes may even include a small section of semiconductive material. Any of these techniques may introduce some incidental impedance. The phrases "negligible impedance" and "negligible impedance means" are used in a generic sense herein and in the appended claims to include incidental impedances.

What is claimed is:

1. The combination comprising:

first, second, third and fourth semiconductor devices, each device having an input electrode, an output electrode, a control electrode, and a conduction channel between the input and output electrodes; and output electrodes;

the impedances of the conduction channels in the first and third devices being greater than the impedances of the conduction channels in the second and fourth devices for the same value of forward bias;

negligible impedance means connecting the output electrodes of the first and third devices to each other and cross-coupling those electrodes to the control electrode of the second device;

negligible impedance means connecting the output electrodes of the second and fourth devices to each other and cross-coupling those electrodes to the control electrode of the first device; and input means connected at a point common to the output electrodes of the first and third devices.

2. The combination as claimed in claim 1, wherein the first, second, third and fourth devices are insulated-gate field-effect transistors of the same conductivity type, and wherein the control electrodes of the third and fourth transistors are maintained at a fixed potential.

3. The combination as claimed in claim 1, wherein said input means includes an input terminal, and a fifth semiconductor device having its conduction channel connected between said input terminal and a point common to the output electrodes of the first and third devices, wherein the impedance of the conduction channel in the fifth device is smaller than the impedances of the conduction channels in the first and third devices for the same value of forward bias.

4. The combination as claimed in claim 3, including means for applying input signals at said input terminal, and means for applyng control signals at the control electrode of said fifth device to render said fifth device selectively conductive and nonconductive.

5. The combination as claimed in claim 3, wherein all of the devices are insulated-gate field-effect transistors, the first and second transistors being of one conductivity type, the third and fourth transistors being of the opposite conductivity type; wherein the control electrodes are gates, the input electrodes are sources, and the output electrodes are drains; and including: means connecting the sources of the first and second devices to a first common point; means connecting the sources of the third and fourth devices to a second common point; and negligible impedance means connecting the gates of the third and fourth transistors to the gates of the first and second transistors, respectively.

6. The combination as claimed in claim 5, including means for connecting a source of operating potential between said first and second common points.

7. The combination as claimed in claim 5, wherein the impedance of the conduction channel in each of the second and fourth transistors is substantially the same as the impedance of the conduction channel in the fifth transistor for the same value of forward source-gate bias.

8. The combination as claimed in claim 7, wherein said input means further includes a sixth insulated-gate field-effect transistor connected in parallel with the conductive channel of the fifth transistor, wherein the impedances of the conduction channels in the fifth and sixth transistors are smaller than the impedances of the conduction channels in the first and third transistors for the same value of forward source-gate bias, and wherein the fifth and sixth transistors are of the one conductivity type and opposite conductivity type, respectively.

9. The combination as claimed in claim 8, including means for applying input signals at said input terminal, and means for applying control signals at the gates of the fifth and sixth transistors to render the latter said transistors concurrently conductive and concurrently nonconductive, selectively.

References Cited

UNITED STATES PATENTS

| | | | |
|---|---|---|---|
| 3,134,912 | 5/1964 | Evans | 307—279 |
| 3,267,295 | 8/1966 | Zuk | 307—279 |
| 3,389,383 | 6/1968 | Burke et al. | 340—173 |

JOHN S. HEYMAN, Primary Examiner

H. A. DIXON, Assistant Examiner

U.S. Cl. X.R.

307—238, 304; 340—173